Nov. 5, 1929.       H. K. HITCHCOCK       1,734,380
APPARATUS FOR MAKING COMPOSITE GLASS
Filed Feb. 20, 1928

INVENTOR
Halbert K. Hitchcock
by
James C. Bradley
atty

Patented Nov. 5, 1929

1,734,380

UNITED STATES PATENT OFFICE

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA

APPARATUS FOR MAKING COMPOSITE GLASS

Application filed February 20, 1928. Serial No. 255,588.

The invention relates to apparatus for making composite glass wherein heat and pressure are applied to cause a joinder between the glass and celluloid. Composite glass ordinarily comprises two sheets of glass with a sheet of celluloid or equivalent material cemented therebetween, although a greater number of sheets may be employed. It is the practice to assemble the sheets with a coating of cement, such as gelatin, dried upon the surfaces of the glass sheets which are to be cemented to the celluloid, the heat subsequently applied serving to soften the gelatin and secure adhesion when pressure is applied.

Figure 1:
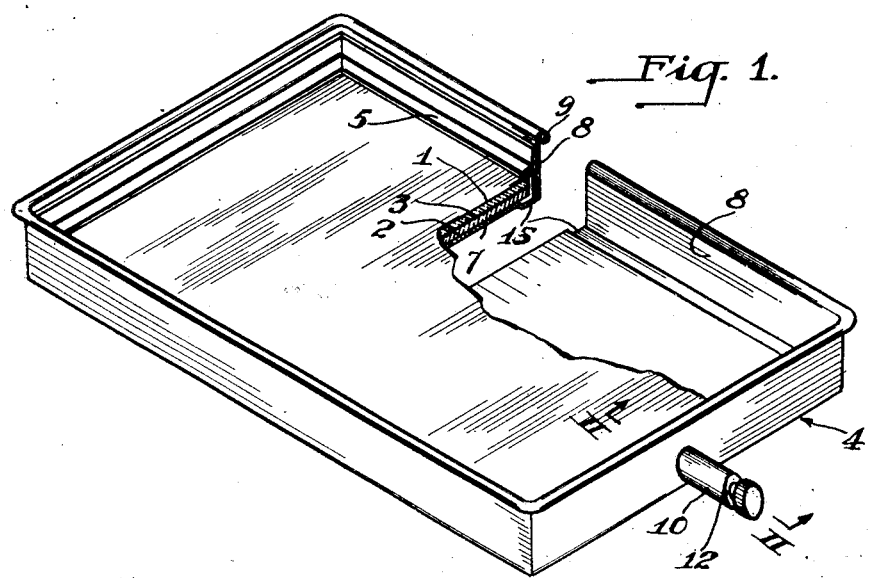
Figure 2:
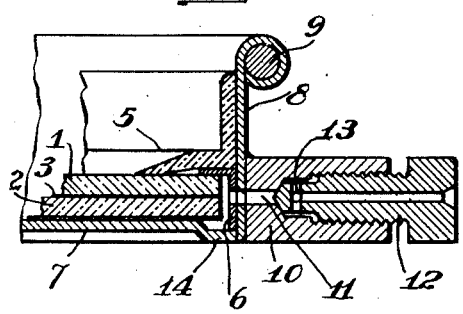
Figure 3:
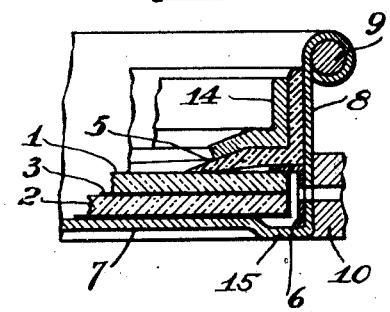

The present invention has for its primary objects the provision of improved means for securing the series of sheets together, preliminary to the heating and pressing operation, so that such sheets are firmly held in assembled position, and so that the lines of joinder between the plates at the margins thereof are protected against the application of fluid pressure, the present construction constituting a further development of the invention disclosed in the application of W. G. Lytle, Serial No. 252,206. Certain embodiments of the invention are illustrated in the accompanying drawings, wherein:

Figure 1 is a perspective view of the assembled construction with certain parts broken away at one corner in order to more clearly show the construction. Fig. 2 is a section on the line II—II of Fig. 1. Fig. 3 is a view similar to that of Fig. 2, but with the angle frame applied for pressing the sealing angle tightly into position. And Fig. 4 is a section showing a modification.

In carrying out the process, the sheets to be joined together are assembled, as indicated in Fig. 2, wherein 1 and 2 are glass sheets and 3 is the interposed sheet of celluloid or other similar material. These plates have been previously treated to prepare them for the pressing operation, such treatment involving the cleaning of the glass and celluloid sheets and the application to one side of each of the glass sheets of a thin film of gelatin or other cement. This cement is of such a character that when the celluloid sheet is placed between the two sheets of glass and heat and pressure applied thereto, the cement will be softened and the sheets will be securely attached together when the composite plate is cooled off, it being desirable that this cooling off should occur while the sheets are under pressure. If gelatin is used in as a cement, the heat applied will ordinarily be about 250 degrees F. and the pressure about 150 pounds per square inch. The temperature specified is sufficient to slightly soften the celluloid so that the opposing faces of the celluloid and glass are brought into intimate contact. In carrying out the pressing operation, the assembled sheets are placed in a tank and hydraulic pressure is applied, heated liquid being used, so that the liquid as thus applied not only gives the desired degree of pressure, but also provides a medium for softening the gelatin, so that the sheets are heated and pressed at one operation. Under these conditions, it is, of course, necessary that the pressure should not be applied to the sheets where they come into contact, since fluid pressure applied at the lines of joinder between the sheets would penetrate the joints and tend to separate the sheets, so that the pressure on the faces of the sheets would be ineffective to secure the desired result.

The means employed for preventing the application of fluid pressure to the juncture between the sheets will be seen by reference to Figs. 1 and 2. This means comprises the tray 4, preferably of sheet metal, the sealing strip or angle 5, and the angle member 6. The tray comprises the bottom sheet 7 and the side walls 8 turned over at their upper edges around a rod 9 in order to provide a reinforcing. After the assembled sheets 1, 2 and 3 are placed in the tray, the angle member 6 is applied, such angle member being of metal and having one flange lying in opposition to the edges of the sheets and the other flange lying above the upper surface of the top plate 1. The last member to be applied is the sealing member 5 of rubber, such member being in the form of an angle with one flange engaging the side walls of the tray and the other flange overlapping the flange of the angle member 6 and engaging the upper surface of the top sheet 1, Welded to one of the side walls 8 of the tray is the plug 10 having the passage 11 therethrough in line with perforations through the wall of the tray and the vertical flange of the angle 6. This plug is threaded interiorly and carries the valve member 12. This valve is shown in closed position, but may be opened by rotating it so as to bring the end 13 out of engagement with its seat. This provides a means for exhausting the air from the interior of the tray, an exhaust nozzle being applied to the member 12, which is rotated so as to open the valve, and after the exhaust has taken place, the member 12 is screwed back to closed position. The exhausting of the air from the interior of the tray insures that the flanges of the sealing angle 5 shall be in tight engagement with the side walls 8 of the tray and with the upper surface of the top sheet 1. In order to prevent any leakage while the exhaust operation is being carried on, a presser member 14 is preferably employed, such member being forced down tightly against the sealing angle 5, so that its flanges are pressed tightly into engagement with the vertical walls of the tray and with the upper surface of the glass plate 1. After the air has been exhausted from the interior of the tray, it is placed in a hydraulic press to which heated water under pressure is supplied to give the pressing and heating action heretofore referred to. A number of the assembled plates in their trays are pressed in the tank at one operation, and after this pressing operation, the trays are removed from the tank and their contents removed. The removal of the sealing strips 5 is facilitated by the application of air pressure through the plugs 10, a nozzle being applied to the member 12 which is turned so that air pressure is admitted through the passage 11. The use of the angle 6 serves to prevent the application of pressure to the extreme edges of the sheet, this being desirable as such pressure applied at the edges of the sheets tends to thin and squeeze out the celluloid, so that a crack develops after the composite sheet is removed from the pressing apparatus. The provision of the downward curve 15 in the bottom plate 7 also assists in avoiding the application of pressure to the extreme edges of the sheets.

Figure 4:
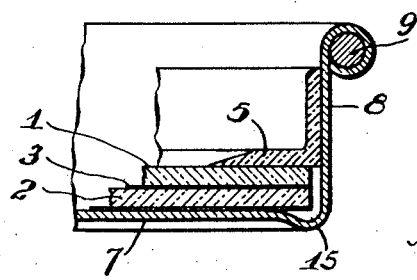

Fig. 4 illustrates a modification in which the angle member 6 of Fig. 3 is omitted. Although this is a simpler construction than that of Fig. 3, it is not as desirable a one, for the reason above indicated; namely, the absence of the angle 6 permits the application of pressure to the sheets at their extreme edges tending to thin and squeeze out the celluloid.

What I claim is:

1. In combination in apparatus for securing together a set of sheets of similar size arranged in a pile with their edges flush to form a plate of composite glass, a tray adapted to receive the sheets and having side walls extending above the level of the top sheet of the series, an angle member of rubber fitting in the tray with one flange engaging the upper surface of the top sheet of the series and the other flange engaging the side walls of the tray, and a connection for exhausting the air from the tray beneath said angle member.

2. In combination in apparatus for securing together a set of sheets of similar size arranged in a pile with their edges flush to form a plate of composite glass, a tray adapted to receive the sheets and having side walls extending above the level of the top sheet of the series, an angle member of rubber fitting in the tray with one flange engaging the upper surface of the top sheet of the series and the other flange engaging the side walls of the tray, means including a passage leading into the interior of the tray for exhausting the air therefrom, and presser means engaging said angle member for pressing it into position during the exhausting operation.

3. In combination in apparatus for securing together a set of sheets of similar size arranged in a pile with their edges flush to form a plate of composite glass, a tray of sheet metal adapted to receive the sheets and having side walls extending above the level of the top sheet of the series, and an angle member of rubber fitting in the tray with one flange engaging the upper surface of the top sheet of the series and the other flange engaging the side walls of the tray.

4. In combination in apparatus for securing together a set of sheets of similar size arranged in a pile with their edges flush to form a plate of composite glass, a tray adapted to receive the sheets and having side walls extending above the level of the top sheet of the series, an angle member of metal fitting in the tray with one flange between the edges of the sheet and the side wall of the tray and the other flange above the top sheets of the series, and an angle member of rubber fitting in the tray, above said metal angle member with one flange in parallel with the side wall of the tray and with the other flange overlapping the upper flange of the metal angle member and engaging the upper surface of said top sheet of the series.

5. In combination in apparatus for securing together a set of sheets of similar size arranged in a pile with their edges flush to form a plate of composite glass, a tray adapted to receive the sheets and having side walls extending above the level of the top sheet of the series, an angle member of metal fitting in the tray with one flange between the edges of the sheets and the side wall of the tray and the other flange above the top sheet of the series, an angle member of rubber fitting in the tray above said metal angle member with one flange in parallel with the side wall of the tray and with the other flange overlapping the upper flange of the metal angle member and engaging the upper surface of said top sheet of the series, and means including a passage leading into the interior of the tray for exhausting the air therefrom.

In testimony whereof, I have hereunto subscribed my name this 16th day of February, 1928.

H. K. HITCHCOCK.